(12) United States Patent
Langue

(10) Patent No.: US 7,753,404 B2
(45) Date of Patent: Jul. 13, 2010

(54) AIRBAG ARRANGEMENT

(75) Inventor: Nicolas Langue, Gournay en Bray (FR)

(73) Assignee: Autoliv Development AB, Vargarda (SE)

( * ) Notice: Subject to any disclaimer, the term of this patent is extended or adjusted under 35 U.S.C. 154(b) by 77 days.

(21) Appl. No.: 11/970,104

(22) Filed: Jan. 7, 2008

(65) Prior Publication Data
US 2008/0164680 A1 Jul. 10, 2008

Related U.S. Application Data

(63) Continuation of application No. PCT/EP2006/006082, filed on Jun. 23, 2006.

(30) Foreign Application Priority Data
Jul. 6, 2005 (DE) .................. 10 2005 031 828

(51) Int. Cl.
B60R 21/239 (2006.01)
B60R 21/237 (2006.01)
B60R 21/21 (2006.01)

(52) U.S. Cl. .................. 280/739; 280/730.2; 280/743.2
(58) Field of Classification Search ................. 280/739, 280/728.2, 743.2, 730.2, 742
See application file for complete search history.

(56) References Cited

U.S. PATENT DOCUMENTS

| | | | |
|---|---|---|---|
| 5,498,031 A * | 3/1996 | Kosugi | 280/743.2 |
| 6,588,795 B2 * | 7/2003 | Fischer et al. | 280/736 |
| 6,648,371 B2 | 11/2003 | Vendely et al. | |
| 6,962,366 B2 * | 11/2005 | Fukuda et al. | 280/743.1 |
| 2003/0020266 A1 | 1/2003 | Vendely et al. | |
| 2003/0222446 A1 | 12/2003 | Soderquist et al. | |
| 2006/0108777 A1 * | 5/2006 | Mabuchi et al. | 280/730.2 |

FOREIGN PATENT DOCUMENTS

WO  WO2004/106122  *  9/2004

* cited by examiner

Primary Examiner—Paul N Dickson
Assistant Examiner—Keith Frisby
(74) Attorney, Agent, or Firm—Brinks Hofer Gilson & Lione

(57) ABSTRACT

An airbag device comprises an airbag having at least one chamber, which can be filled with gas by a gas generator, and a ventilation opening in fluid communication with the chamber. The ventilation opening is sealed by an airbag section, which is detachably mounted to a fastening member, and is configured as an insertion opening for the gas generator.

11 Claims, 2 Drawing Sheets

AIRBAG ARRANGEMENT

CROSS REFERENCE TO RELATED APPLICATIONS

This application claims priority to PCT patent application WO 2007/003282 filed Jun. 23, 2006 and DE application 10 2005 031 828.2 filed Jul. 6, 2005.

FIELD OF INVENTION

The invention relates to an airbag device for protection of a vehicle occupant.

BACKGROUND OF THE INVENTION

Airbags serve to mitigate the kinetic energy of a vehicle occupant in the event of an accident. In the event of an accident, the vehicle occupant becomes immersed in an inflating or already inflated airbag. The controlled escape of the gas from the airbag slows down the motion of the vehicle occupant, preventing or reducing injury. To this end, it is important that the airbag inflate as completely as possible as rapidly as possible. It is problematic, however, that different pressure levels must be built up in the airbag for various occupants with different body weights and body sizes and for different accident sequences. An adapted escape of the gas from the airbag should likewise be provided to account for the different accelerations and forces as a function of the severity of the accident and the constitutions of the vehicle occupants. To this end, a so-called active or adaptive ventilation of the airbag is proposed.

There is known from U.S. Pat. No. 6,648,371 B2 an airbag unit comprising a variable ventilation in which the ventilation characteristic is implemented by a selective displacement of sealing devices for ventilation openings. After collecting sensor data regarding the vehicle occupants and possibly the severity of the accident, the required airbag volume and amount of ventilation are calculated to achieve optimum deceleration values for the vehicle occupants. To this end, it is suggested in an example embodiment that within the airbag, a retaining strap fastens a hose-like gas distribution system, which is tucked inwards, to a fastening means. If the airbag is inflated by a gas generator, the retaining strap is released as a function of sensor data, and the gas distribution section turns outwards and discharges the gas into the environment at a fixed time. To this end, a fastening frame clamps the airbag to a base plate, upon which the gas generator is also fastened. However, the disadvantage to this is the complexity of assembly and the associated high cost because the retaining strap is guided inside the airbag and the airbag is screwed onto the base plate together with the gas generator.

SUMMARY OF THE INVENTION

The object of the present invention is to provide an improved airbag device, which is economical to manufacture and easy to assemble without disadvantageously affecting the adjustability of the ventilation.

In at least one embodiment of the present invention, an airbag device is provided. The airbag device comprises an airbag including at least one chamber, which can be filled with gas by a gas generator, and a ventilation opening in the chamber, which is sealed by an airbag section which is mounted on a fastening means. The ventilation opening is configured as an insertion opening of the gas generator. This may have the advantage that the insertion opening does not need to be sealed separately after the gas generator has been inserted, and that no second opening, which is within the chamber and serves as a ventilation opening, must be manufactured and sealed in such a manner that it is released upon an appropriate signal. The airbag device according to the invention may be more economical to manufacture and may require less expense for assembly.

In at least one aspect of the present invention, the airbag section is externally folded over the ventilation opening on one side of the airbag, sealing the ventilation opening. No devices may therefore be necessary inside the airbag after the peripheral seam has been closed. Rather, the airbag can be completely sewn before the gas generator and, if necessary, the fastening means is inserted into the airbag or into the chamber. The airbag section may then be turned in such a manner that the gas generator insertion opening is sealed such that the ventilation opening is sealed simultaneously, wherein the airbag section can be directly fastened to the fastening means either through a recess configured in the airbag section or by a retaining strap.

In its mounted state, the gas generator can partially project out of the ventilation opening and be covered by the airbag section so long until a release of the airbag section is accomplished by displacing the fastening means or by decoupling the airbag section from the fastening means.

In one example, to reduce the number of components, the airbag section can be configured on the airbag as a one-piece integral construction with only one fastening device being provided for the fastening to the fastening means. Alternatively, a retaining strap, which is detachably coupled to the fastening means, can be arranged on the airbag section, thereby saving fabric material for the airbag. The airbag section, which covers the ventilation opening, can be sewn on as a separate element and does not need to be part of the inflatable chamber. The airbag section can also consist of a different material than the rest of the airbag.

In one embodiment of the present invention, the fastening means is configured as a displaceable bolt, which is coupled to an actuator, which is displaced as a function of sensor values and releases the airbag section or retaining strap. In one example, the extent and time of ventilation is determined as a function of acceleration values and measured data about the vehicle occupants. If a soft airbag is required, the retaining strap may be released at a very early time to permit as large amounts of the gas as possible to escape from the airbag.

In another aspect, the fastening means, and possibly also the actuator, may be arranged outside of the airbag so that no other components, other than the gas generator, have to be arranged within the airbag or chamber.

In yet another aspect, to accelerate the inflation and to increase the thickness of the airbag, the length of the airbag section or retaining strap, possibly together with the airbag section, may be configured such that a portion of the inflatable chamber volume is folded over and, if necessary, the ventilation opening may be configured in the turned-over airbag section. This may reduce the airbag volume to be filled, wherein a fold line for the airbag section can be configured by means of a tear seam. On the one hand, a fold line for the airbag section may be predefined and, on the other hand, the chamber within the airbag may be sealed and the tear seam may burst and release the ventilation opening only when a predefined pressure is reached. In addition to turning over and fastening the airbag section or the retaining strap to the fastening means, a tear seam may fasten the airbag section to the airbag so that the tear seam or seams can effectively control the ventilation.

BRIEF DESCRIPTION OF THE DRAWINGS

Example embodiments of the invention will be explained in more detail below on the basis of the included figures. The drawings are as follows.

DETAILED DESCRIPTION

Figure 1:
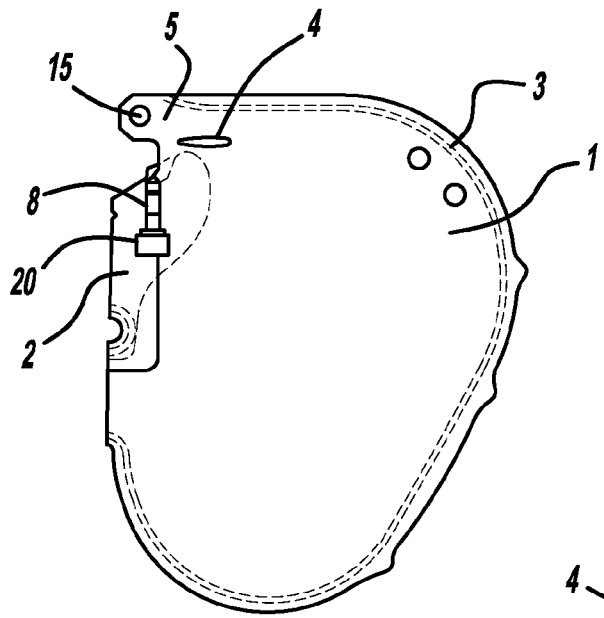
FIG. 1 is a side view of an airbag in its unfolded state in accordance with at least one embodiment of the present invention.
Figure 2:
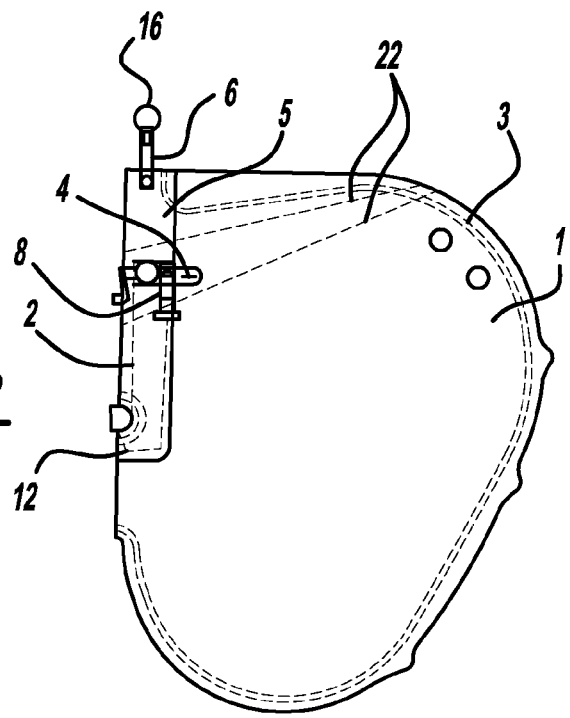
FIGS. 2 and 3 are variants of the airbag depicted in FIG. 1.

FIG. 1 depicts an airbag 1 comprising a recess 2 for a gas generator 12 (see FIG. 2). A peripheral seam 3 closes the airbag 1. A ventilation opening 4 through which the gas can escape if the gas generator 12 is triggered is configured within the airbag 1. The ventilation opening 4 is configured between an airbag section 5 and a fastening means 8 and is sealed by folding up airbag section 5 onto the airbag 1.

An opening 15 is formed in the airbag section 5 and is fastened to the fastening means 8 so that the ventilation opening 4 is sealed after folding and fastening. If the gas generator 12 is triggered, the airbag 1 inflates until the required volume is attained. When a predefined pressure value is attained or after a fixed time, which is determined based on the deceleration values of the vehicle in the event of an accident and the measured or estimated biometric values of the vehicle occupants, a fastening member or means 8, which can be configured as displaceable bolts or any other suitable means for fastening known in the art, loosens so that the airbag section 5 is released. The ventilation opening 4, which at the same time is also the insertion opening for the gas generator 12, thereby opens and gas can be discharged from the chamber formed inside airbag 1 into the interior vehicle environment or into a separate volume. The fastening means 8 and an actuator 20 (schematically shown for illustrative purposes only), which may be for example a pyrotechnical element, is preferably fastened to the vehicle outside the airbag 1, such as to an interior trim or to a housing part of the airbag unit for example.

FIG. 2 illustrates an example of the airbag device in which a separate retaining strap 6 comprising a ring fastener 16 is fastened to the airbag section 5 to be folded over. The ventilation opening 4 may extend over a large portion of the recess 2 for the gas generator 12. The gas generator 12 may project through the recesses 13 (see FIG. 4a, and also schematically shown for illustrative purposes only in FIG. 2) provided for it with fastening bolts. The gas generator 12 can also partially project through the ventilation opening 4. The gas that arises after the gas generator 12 is triggered, and may pass completely into the chamber formed in the airbag 1. In the sealed state, the folded or turned airbag section 5 (folded airbag section is schematically shown with dashed lines 22 for illustrative purposes only) seals the ventilation opening 4 and covers that part of the gas generator 12 that may be arranged outside the ventilation opening 4. The fastening means 8 can likewise be inserted into the airbag 1 and project through the ventilation opening 4. The fastening means 8 can be fastened to the gas generator 12, forming a subassembly.

Figure 3:
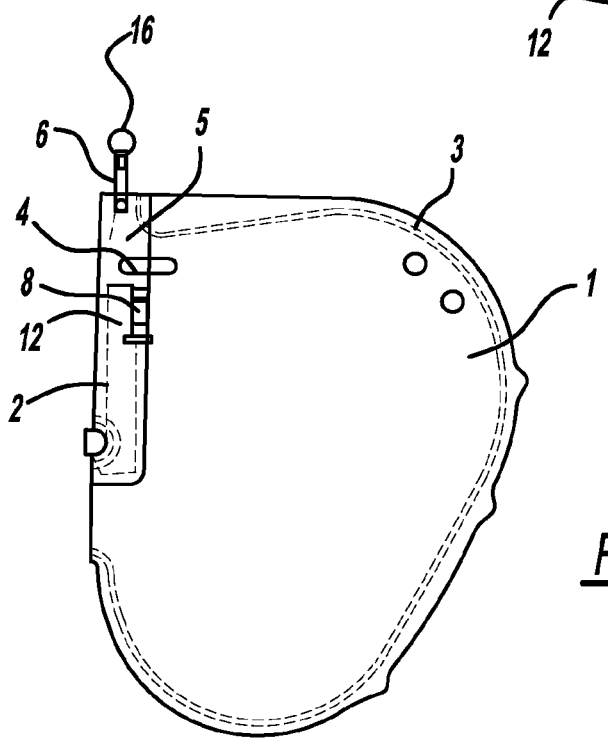

FIG. 3 illustrates an example of the airbag device with a fastening means 8 arranged outside the airbag. The gas generator 12 may be completely accommodated in the airbag section 2 as schematically shown in FIG. 3 for illustrative purposes only.

Figure 4A:
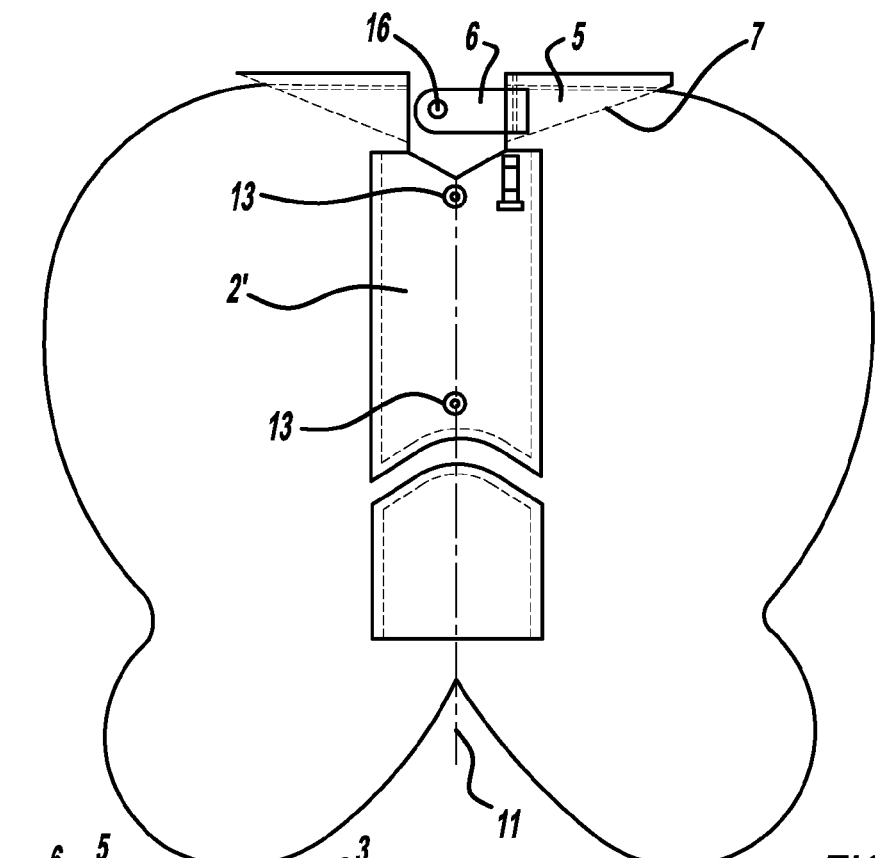
FIG. 4a is a front view of an opened airbag swatch in accordance with at least one embodiment of the present invention.
Figure 4B:
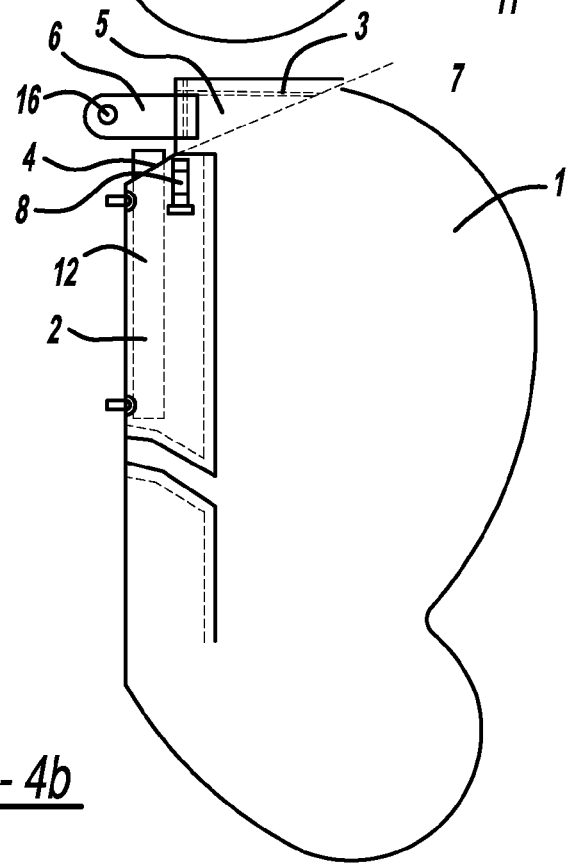
FIG. 4b is a side view of an airbag folded together and sewn in accordance with at least one embodiment of the present invention.

FIG. 4a depicts an embodiment of a fabric swatch for an airbag 1 which is folded along a center line 11 so that a closed chamber for the airbag 1 can be provided by forming a peripheral seam 3. Another fabric section 2' may be sewn proximate the location which forms the gas generator recess 2 so that airbag 1 can withstand the high thermal load when gas generator 12 is triggered.

Recesses 13 permit fastening bolts of the gas generator 12 to be removed from the closed airbag so that the gas generator 12, together with the airbag 1, can be fastened to the vehicle or a vehicle component. A retaining strap 6 comprising a recess 16 may be sewn above the additional fabric section 2' to fasten said recess 16 to the fastening means 8. After being folded together and sewn together by means of the peripheral seam 3, the gas generator 12 may be inserted through the insertion opening 4. Finally, the airbag section 5 may be turned over along a tear seam 7, which may be installed for extra sealing and serves as fold line, and the insertion opening 4 is sealed. One end of the gas generator 12 may project out of the insertion opening 4. With the recess 16, the airbag section 5 is fastened to the fastening means 8 outside the airbag 1 by the retaining strap 6 and bursts when a predefined airbag internal pressure is reached, by means of a pyrotechnical propelling charge for example, causing the ventilation opening 4 to be released and the extra sealing to fail via the tear seam 7. In addition to a ventilation control by means of fastening means 8, ventilation control can also be provided by the tear seam 7.

The folded-over airbag section 5 can also be fastened to the fabric of the airbag 1 by a tear seam or can be glued to the airbag. When a predefined internal pressure is reached or exceeded, the seam or adhesive seam will then fail and the ventilation opening 4 will open to discharge gas from the airbag 1 into the ambient air.

As a person skilled in the art will appreciate, the above description is meant as an illustration of implementation of the principles of this invention. This description is not intended to limit the scope or application of this invention in that the invention is susceptible to modification, variation and change, without departing from the spirit of this invention, as defined in the following claims.

The invention claimed is:

1. An airbag device comprising an airbag having at least one chamber which is configured to be filled with gas by a gas generator, the airbag defining a ventilation opening in fluid communication with the chamber to allow the gas to escape from the chamber, the ventilation opening is sealed by an airbag section, which is detachably mounted to a fastening member, and is configured as an insertion opening for the gas generator, wherein when the airbag section is mounted to the fastening member the airbag section is folded over to cover up the insertion opening obstructing the ventilation opening and preventing escape of the gas from the chamber through the ventilation opening, and when the airbag section becomes detached from the fastening member the airbag section moves uncovering the insertion opening to unobstruct the ventilation opening so that the gas escapes from the chamber through the ventilation opening.

2. The airbag device according to claim 1, wherein the airbag section is externally folded over the ventilation opening on one side of the airbag including the airbag section extending over and covering up the insertion opening.

3. The airbag device according to claim 1, wherein in a mounted state, the gas generator has an end portion that projects out of the insertion opening and is covered up by the airbag section including the airbag section extending over and covering up the end portion.

4. The airbag device according to claim 1, wherein the airbag section is configured with the airbag as one-piece integral construction.

5. The airbag device according to claim 1, wherein a retaining strap, which is detachably coupled to the fastening member, is disposed on the airbag section.

6. The airbag device according to claim 1, wherein the fastening member is a displaceable bolt which is coupled to an actuator, the actuator displaces the displaceable bolt in response to a predetermined sensor value and releases one of the airbag section and a retaining strap that is detachably coupled to the fastening member and is disposed on the airbag section.

7. The airbag device according to claim 6, wherein the predetermined sensor value is a function of at least one of a severity of an accident and an occupant's weight.

8. The airbag device according to claim 6, wherein at least one of the fastening member and the actuator are disposed outside the airbag.

9. The airbag device according to claim 1, wherein the ventilation opening is formed in the airbag section which is folded over on one side of the airbag so as to cover up the insertion opening.

10. The airbag device according to claim 1, wherein the airbag section has a tear seam formed thereon.

11. The airbag device according to claim 10, wherein the tear seam is configured as a fold line for the airbag section.

* * * * *